Figure 3:
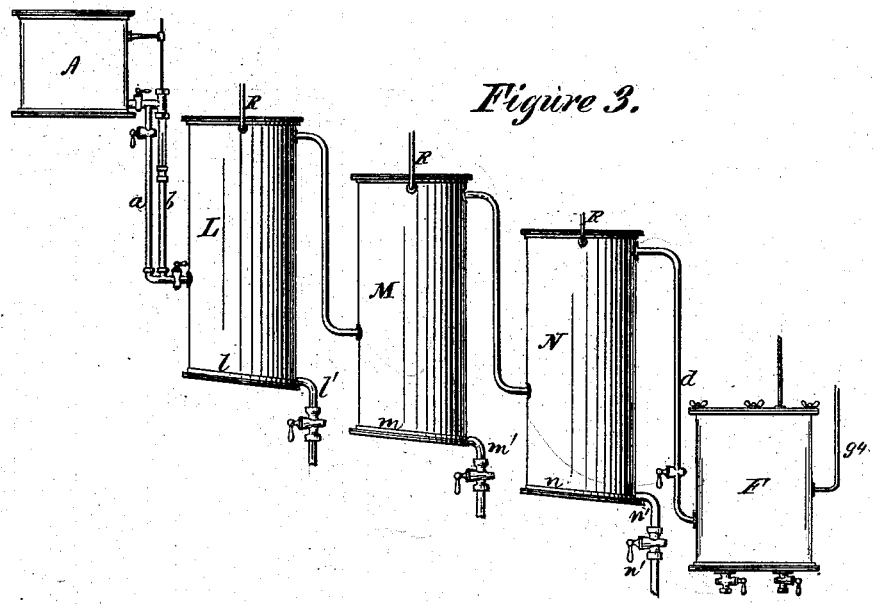

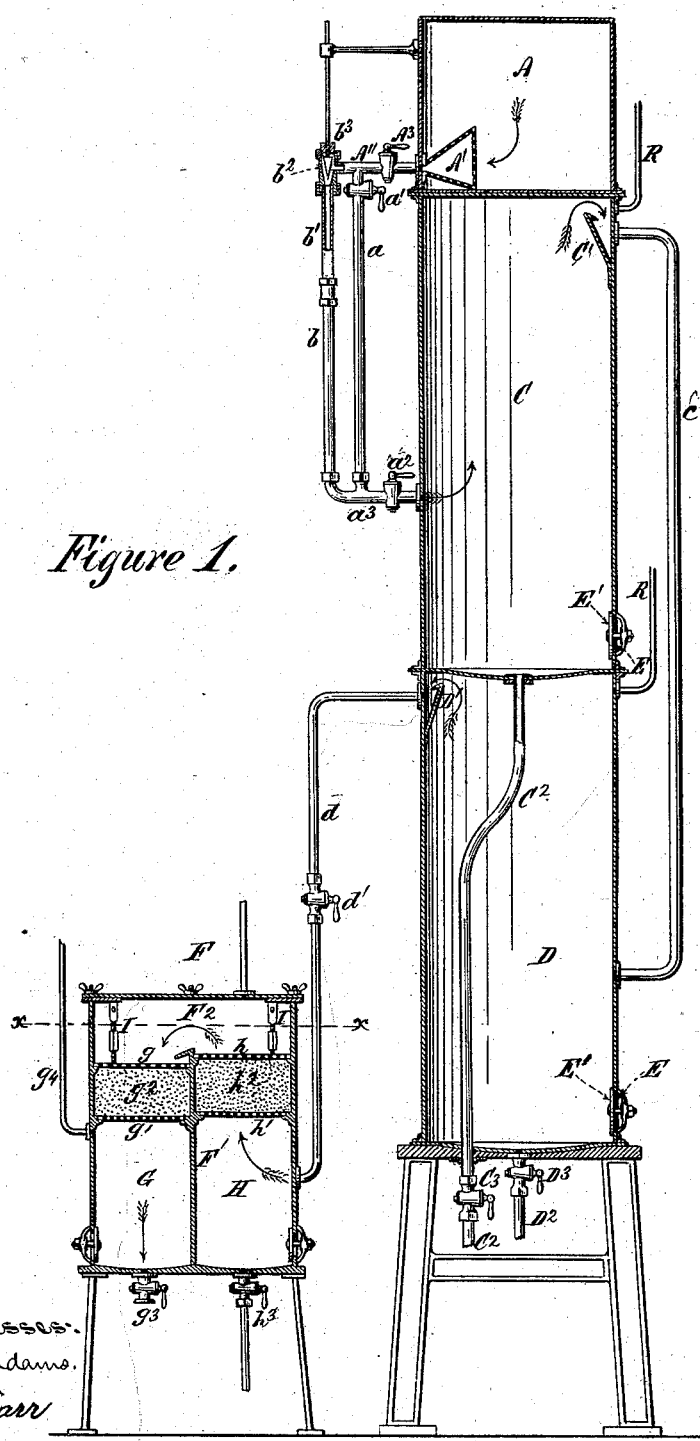

(No Model.) 2 Sheets—Sheet 2.

A. KOELLNER.
Apparatus for Purifying Oil.

No. 240,910. Patented May 3, 1881.

Witnesses:
M. L. Adams.
Asa Farr

Inventor:
Anton Koellner
Per Edw. E. Quimby
atty.

UNITED STATES PATENT OFFICE.

ANTON KOELLNER, OF NEUMÜHLEN, NEAR KIEL, PRUSSIA, GERMANY.

APPARATUS FOR PURIFYING OIL.

SPECIFICATION forming part of Letters Patent No. 240,910, dated May 3, 1881.

Application filed November 15, 1880. (No model.) Patented in Germany October 3, 1879, in Austria May 29, 1880, and in Hungary May 29, 1880.

*To all whom it may concern:*

Be it known that I, ANTON KOELLNER, of Neumühlen, near Kiel, Holstein, Prussia, have invented certain Improvements in Apparatus for Purifying Oil, of which the following is a specification.

My improvements relate to the construction and arrangement of apparatus for purifying oil by settling it and filtering it.

My invention consists of one or more settling-tanks and a filtering-vessel, through which oil supplied from one elevated reservoir is made to flow by its own gravity, and devices for governing the duration of the consecutive operations of settling and filtering it by regulating the flow of oil. My tanks may be superposed or supported alongside of each other upon different levels. They are so connected by pipes that the oil is introduced into each of them at a point, say, one-third above the bottom, and is discharged through an outlet near the top. I preferably connect the elevated reservoir with the first settling-tank by two supply-pipes, in order to effect the rapid filling of the first settling-tank to the desired level at the commencement of the operation. I provide valves suitably placed to enable me to use either one or both of the supply-pipes. The upper section of one of the supply-pipes is made of glass, to answer as a gage for showing the height of the oil in the settling-tank, and to permit the flow of oil from the reservoir to be observed after the principal supply-pipe is closed. When the first settling-tank has been filled nearly to the top the valve of the principal supply-pipe is closed, and a valve in the upper end of the other pipe is then so adjusted that the oil drips from the reservoir more or less slowly, as may be desired. From the settling-tank—or, if there be more than one, from the last settling-tank—the oil is conducted to the filter, which is a vessel divided into three compartments by means of filtering material confined between pairs of parallel perforated plates, respectively extending transversely across from the sides of the vessel, some distance below the top, to a central vertical partition extending downward to the bottom of the vessel. The oil received into one of the lower compartments is forced by hydrostatic pressure upward through the filtering material at the top of the receiving-compartment into the upper compartment, and thence downward through the adjoining mass of filtering material into the other lower compartment.

It will thus be seen that the settling and filtering operations are consecutive and continuous, and that not only the duration of the settling operation, but the speed with which the oil is forced through the filtering material, is placed completely under observation and control by means of the glass section of the supply-pipe and its valve for regulating the drip of oil from the elevated reservoir to the first settling-tank.

Figure 2:
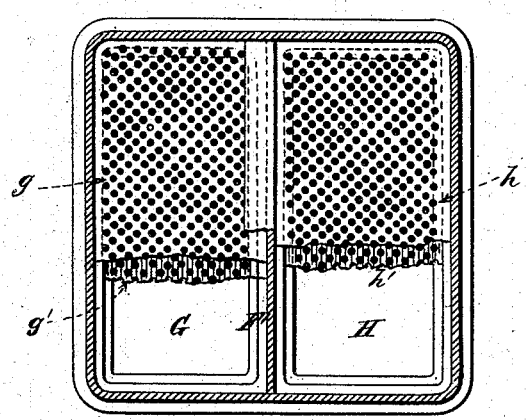

The accompanying drawings, representing apparatus embodying my improvements, are as follows:

Figure 1 is a central vertical section of the apparatus, showing the elevated reservoir and a series of superposed tanks and the filtering-vessel, together with the pipe-connections and valves. Fig. 2 is a horizontal section of the filtering-vessel through the line $x\,x$ on Fig. 1, representing portions of the perforated plates as broken away. Fig. 3 is a vertical section, showing the settling-tanks arranged side by side on slightly different levels.

In carrying out my invention any required number of settling-tanks may be employed. In Fig. 1 of the drawings two superposed settling-tanks are shown, the upper one of which is surmounted by a reservoir, A, in which the oil to be purified is primarily deposited, and from which it is discharged through the screened outlet A' into the pipe A'', and through the pipes $a$ and $b$ into the lower portion of the upper settling tank, C.

The two vertical pipes $a$ and $b$ are connected to the horizontal outlet-pipe A'', which is provided with the valve $A^3$ between its point of junction with the vertical pipe $a$ and the reservoir. This valve may be used to regulate the discharge of oil from the elevated reservoir A; but in order to effect a more exact regulation of the discharge, and to place it under observation, the vertical pipe $b$ is made in two sections, the upper one, $b'$, being of glass, and being inserted, at its upper end, into the mouth of a cone-valve on the end of an outlet-pipe. This cone-valve is provided with a vertical plunger, $b^2$, the raising or lowering of which serves to vary the area of the passage through which oil flows from the outlet-pipe into the glass pipe $b'$. The upper end of the pipe $a$ is provided with a valve, $a'$, and a valve, $a^2$, may also be provided in the branch pipe $a^3$, with the two branches of which the lower ends of the pipes $a$ and $b$ are connected.

In operation, at the commencement the valves are all opened until the upper settling-tank, C, is nearly filled with oil, as may be ascertained by observing the level of the oil in the glass section $b'$ of the tube $b$. Then the valve $a'$ at the upper end of the pipe $a$ is closed, and the supply of oil is regulated by adjusting the valve $A^3$ and the conical valve $b^3$, so that henceforward the oil from the elevated reservoir A will drip as slowly as may be desired through the pipe $b$ into the upper settling-tank, C. Thus for different kinds of oils, or oils containing variable quanties of impurities, the settling operation can be variably prolonged, as may be required, to effect perfect clarification. When the upper settling-tank has become nearly full the oil flows over the upper edge of the shield $C'$ into the discharge-pipe $c$, by which it is conducted into the lower portion of the lower settling-tank, D. The inlet for the supply of oil to the settling-tank is preferably at some distance above the bottom and below the middle of the tanks respectively, as shown. Air in the settling-tanks, dislodged by the introduction of the oil, is discharged through the small pipes R at the top of each tank. The lower settling-tank, D, is gradually filled with oil by the overflow from the upper settling-tank through the pipe $c$, and is discharged by the overflow of its oil across the upper edge of the shield $D'$ into the discharge-pipe $d$, which conducts the oil to the filtering-vessel. The bottom of each settling-tank is depressed at the center, and its lowest point is connected with a discharge-pipe for drawing off the contents of the tanks at the bottom when occasion requires.

The discharge-pipe $D^2$, for drawing off the contents of the lower settling-tank, is provided with the valve $D^3$, as shown, and the discharge-pipe $C^2$, for drawing off the contents of the upper receiving-tank, is, in this instance, carried directly through the lower settling-tank, and is provided with the valve $C^3$.

It will, of course, be understood, especially if a greater number of superposed settling-tanks are employed, that the discharge-pipes for drawing off the contents of the bottoms of the tanks may be carried laterally outward and vertically downward on the outside of the tanks; or the tanks may be made with bottoms inclined to one side, and the discharge-pipe may be inserted in the side of the tank, immediately above the lowest part of the bottom, as shown in Fig. 3, which represents, it will be seen, three settling-tanks, L, M, and N, having their bottoms $l, m$, and $n$ inclined to one side, and having discharge-pipes $l', m'$, and $n'$ inserted in the sides of the tanks respectively, immediately above the lowest part of the bottom in each case.

In operating the apparatus, it may be sometimes desirable to draw off the oil from the lower part of a tank and return it to the elevated reservoir A, for the purpose of repeating the settling operation.

Each of the settling-tanks is provided near the bottom with a man-hole, E, and a plate, $E'$, to allow access to the interior of the tank, for the purpose of cleaning it out when required.

The pipe $d$, conducting the oil to the filter, is provided with a valve, $d'$, for use, if necessary.

The filter F consists of a vessel the lower portion of which is divided into two compartments, G and H, by the vertical partition $F'$. The walls of these chambers are suitably shouldered for the support of the perforated plates $g\ g'$ and $h\ h'$ respectively. These perforated plates serve to confine the mass through which the oil is filtered, which may be fibrous, granular, or of any suitable material. The oil introduced into the compartment H is forced upward by the pressure of the column of oil in the pipe $d$, through the filtering material $h^2$, into the upper compartment, $F^2$, and thence falls through the filtering material $g^2$ into the final receiving-compartment G, from which it is withdrawn by means of the valve $g^3$. The compartment G is provided with an outlet-pipe, $g^4$, for the escape of the air dislodged by the introduction of the oil. The compartment H of the filter is provided with a valve, $h^3$, by means of which its contents can be drawn off at the bottom, if desired.

When a fibrous material is used for the filter it may be desirable to compress it between the parallel perforated plates, and provision is made for this by the set-screws I, inserted vertically through the top of the compartment $F^2$, and bearing at the lower end upon the upper perforated plates, $g$ and $h$, respectively.

I claim as my invention in apparatus for the purification of oil by settling it and filtering it—

A filtering-vessel and a series of settling-tanks arranged upon different levels and connected by pipes, each tank having its inlet at a distance above its bottom equal to about one-third of its height, and having its outlet at the top, in combination with a reservoir, and a pipe for supplying oil from the reservoir to the upper settling-tank, rapidly when required, and a branch pipe provided with an adjusting drip-valve, and having a transparent section for the regulation and observation of the supply of oil from the reservoir after the uppermost settling-tank has been filled, the settling-tanks being provided at the bottom with pipes and man-holes, for emptying and cleaning them when required, the whole constructed and operating substantially as set forth.

ANTON KOELLNER.

Witnesses:
T. D. SELNITH,
L. WALBAUM,
*Both of Neumühlen.*